Feb. 4, 1930. K. KOZAKI 1,745,898
DEVICE FOR TRANSMISSION OF MOTION OF ROTATING BODIES
Filed March 1, 1928 4 Sheets-Sheet 1
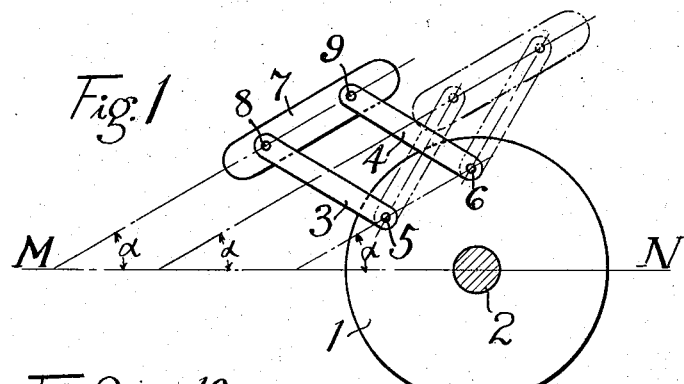
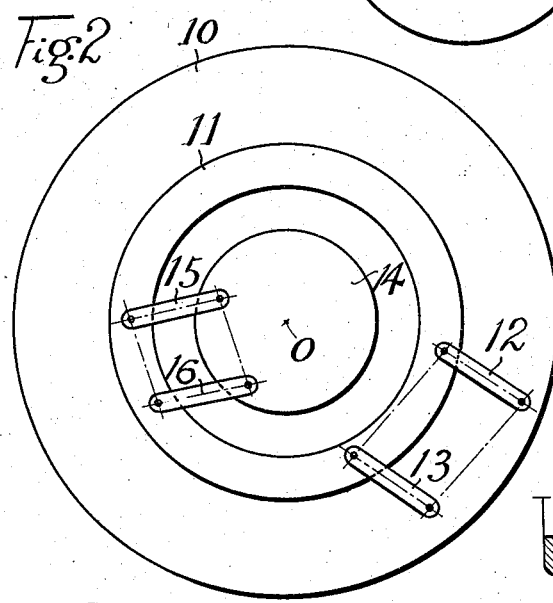
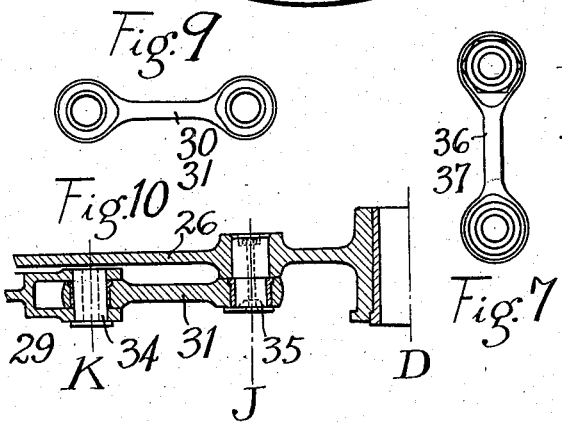
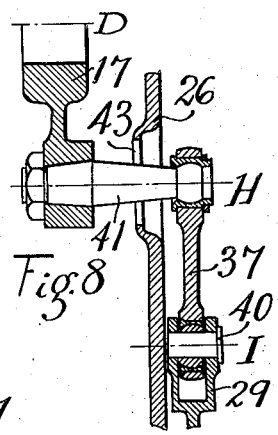
Inventor:
K. Kozaki
By Attorneys: Marks & Clerk

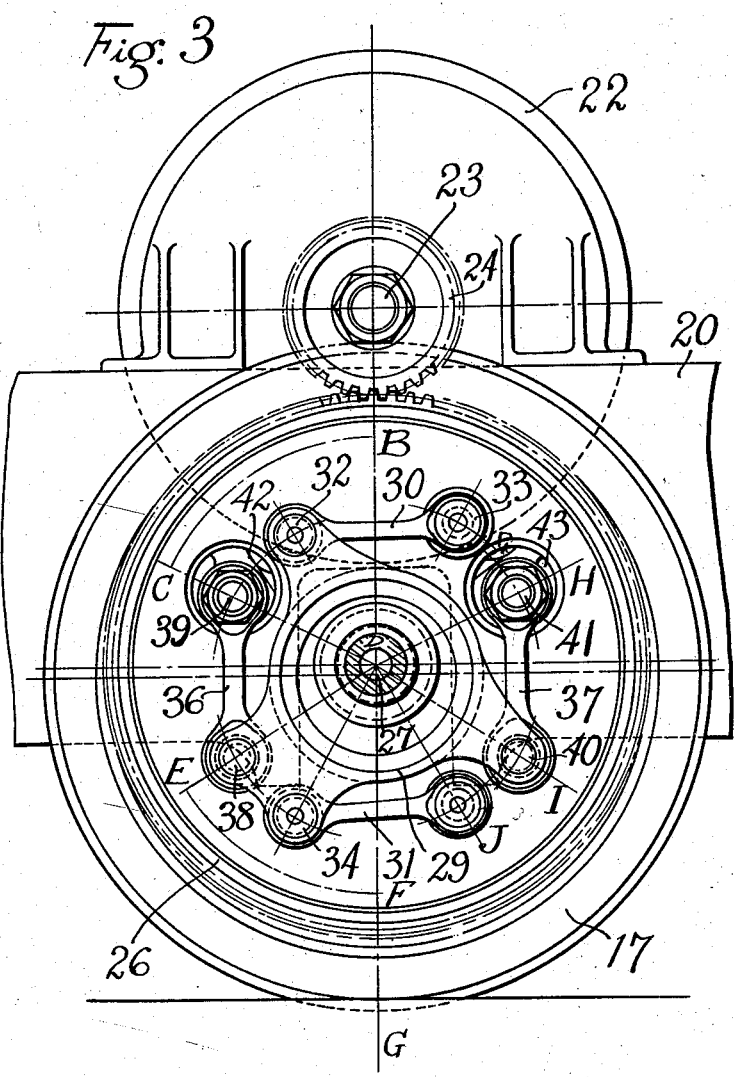

Feb. 4, 1930.  K. KOZAKI  1,745,898
DEVICE FOR TRANSMISSION OF MOTION OF ROTATING BODIES
Filed March 1, 1928  4 Sheets-Sheet 3

Inventor:
K. Kozaki
By Attorneys: Marks & Clerk

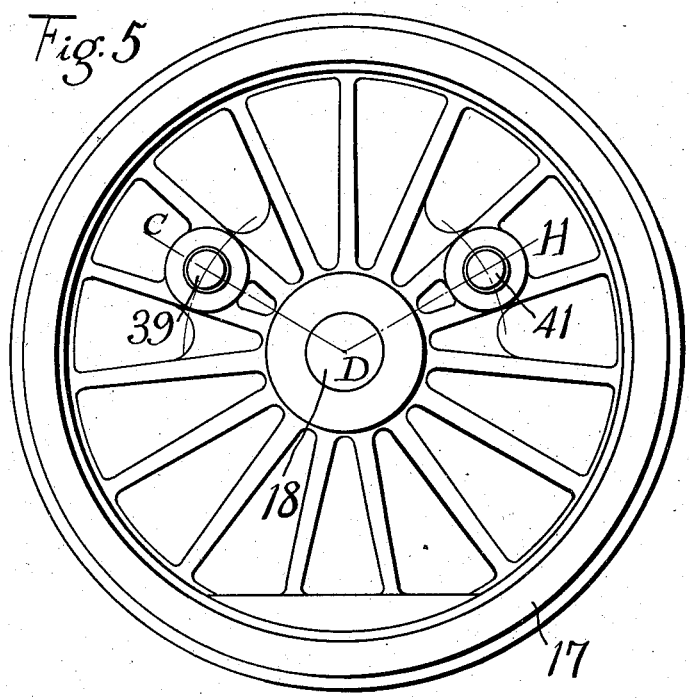
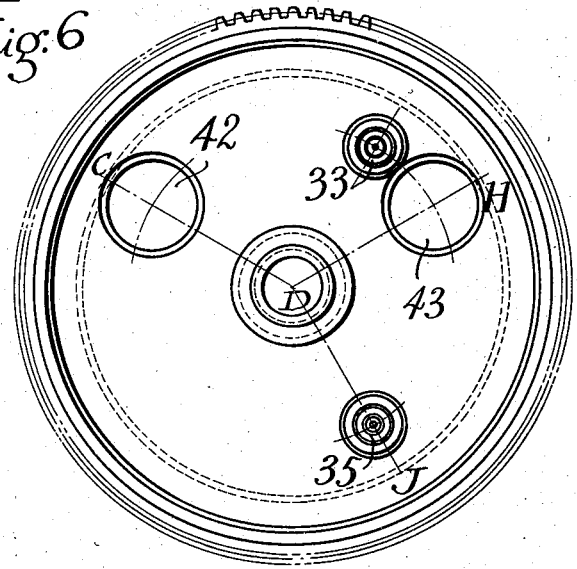

Patented Feb. 4, 1930

1,745,898

UNITED STATES PATENT OFFICE

KAZUO KOZAKI, OF KOBE CITY, JAPAN, ASSIGNOR TO MITSUBISHI ZOSEN KABUSHIKI KAISHA, OF TOKYO, JAPAN

DEVICE FOR TRANSMISSION OF MOTION OF ROTATING BODIES

Application filed March 1, 1928, Serial No. 258,388, and in Japan March 3, 1927.

The present invention relates to a device for transmission of motion of rotating bodies having their axes of rotation parallel or nearly parallel to each other by which the revolving motion of a rotating body is transmitted to the other rotating body, connecting two rotating bodies by means of two-stage quadrilateral link chain with opposite links having equal lengths respectively. The object of the invention is to maintain a good result by applying the device to driving devices of locomotives or electric motor cars, and the like, by making it easy to transmit the revolving motion of a rotating body to the other rotating body having axes of rotation parallel or nearly parallel to each other in the same number of revolutions without using belts or gears, and to keep angular velocities of the two rotating bodies always equal, even when the distance between the two axes changes in running condition of the two rotating bodies as long as the two axes remain parallel to each other.

In the accompanying drawings:

Figs. 1 and 2 are explanatory sketches of working of the device of the present invention;

Fig. 3 is a side view showing only the main parts of the device of the present invention applied to an electric locomotive;

Fig. 5 is a detailed side view of the driving wheel;

Fig. 6 is a detailed side view of the gear wheel;

Fig. 7 is a detailed side view of a link which connects a driving wheel and a connecting link;

Fig. 8 is a sectional side view of Fig. 7 cutting along D—H—I—D of Fig. 3, showing at the same time a part of the driving wheel, and a part of the intermediate link which are jointed to both ends of the connecting link, and a part of the gear wheel;

Fig. 9 is a detailed side view of a link which connects the gear wheel and the intermediate link; and Fig. 10 is a sectional plan of Fig. 9 cut along D—J—K—D of Fig. 3 showing at the same time a part of the gear wheel, and a part of the intermediate link which are jointed to both ends of the connecting link.

Figure 4:
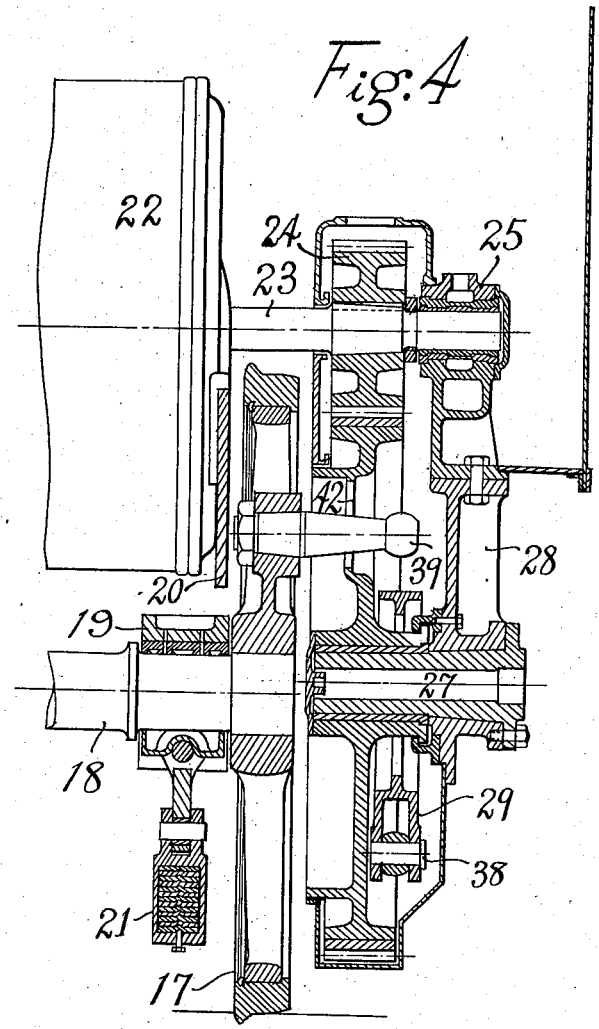
Fig. 4 is a sectional side view of Fig. 3 cut along A—B—C—D—E—F—G looking from the left side and showing only the right half from the centre line of the locomotive with links removed.

When rotary motion of an electric motor is transmitted to the driving axle in a reduced number of revolutions by meshing of a pinion fixed to the electric motor shaft and a gear wheel directly fixed to the driving axle, in the type of an electric locomotive with an electric motor fixed to a frame supported by springs of axle boxes of driving axle, the distance between the electric motor shaft and the driving axle varies because the locomotive frame vibrates as the locomotive runs, and consequently the rate of meshing of gears varies also, and therefore it is almost impossible practically to transmit the motion by such a simple device, and it is advisable to transmit the motion with the help of some proper flexible device for transmission of motion which is placed between the gear wheel and the driving axle or driving wheel, by supporting the shaft of the gear wheel meshing to the pinion fixed to the electric motor shaft, keeping a constant distance from the electric motor shaft. Among this kind of devices of transmission of motion heretobefore invented, some are provided with a hollow driving axle, through the hollow part of which passes an intermediate shaft, one end of which is connected to one end of the driving axle and the other end to the gear wheel by a kind of universal coupling respectively, and some of them are provided with a hollow gear wheel shaft with diameter a trifle larger than that of the wheel shaft and by passing the driving axle through this hollow shaft the gear wheel and the driving wheel are connected by coil springs in a tangential direction at several points; and by means of these devices it is enabled to transmit revolution even when the distance between both axes varies, and in some of them the gear wheel and the driving wheel are connected by a pair of levers with a gear segment at one end, pivoted at the centre to the gear wheel, and by a pair of links pivoted at one end to the driving wheel, the other ends of the levers and links being connected with each other.

But the first two kinds of devices are accompanied with such difficulties in manufacture as using a hollow shaft and the last one has such defects that the angular velocities of the gear wheel and driving wheel are always unequal, excepting only when the axis of the driving wheel perfectly coincides with that of the gear wheel, and that the levers with gear segment are needed.

In the device for transmission of motion of the present invention, the construction is simple and consequently its manufacture and treatment are easy as it consists of links only. The present invention being based upon the two points, that an open link chain consisting of four or more than four links connected in series has such a property, that one of the end links can take any position, within a certain range, while the position of the other being fixed; and that in a quadrilateral link chain with opposite links having the same length respectively, the opposite links are always parallel to each other, i. e., the opposite links make the same angular displacements respectively; the defects of the devices for transmission of motion as described above could preferably be removed by the device for transmission of motion of the present invention.

Since the first point is evident, we will here dispense with explanation on this point; the second point is also a well known fact, but will explain a little on this point.

In Fig. 1, 1 is a disc which can rotate taking 2 as axis, and constitutes a link of the link chain; 3 and 4 are links of equal length and one end of them are jointed to the disc 1 at the points 5 and 6 respectively by means of pins parallel to the axis 2, and the other end of them are jointed to the link 7 at the points 8 and 9 respectively by means of pins parallel to the axis 2, the distance between 8 and 9 being equal to that of, that is to say, a quadrilateral 5, 6, 9, 8 which is thus formed is a parallelogram.

In such a construction, it requires no proof that the line connecting 8 and 9 is always parallel to the line connecting 5 and 6, even when 3 and 4 rotate taking 5 and 6 respectively as their centre, and when the link 7 takes any position. (The chain lines show a changed position of the link 7.) Hence the disc 1 and the disc 7 make the same angular displacement when they rotate, because if the disc 1 rotate rightwards taking the axis 2 as centre, a magnitude of an angle which the line connecting 5 and 6 and the line connecting 8 and 9 make with a horizontal line M, N passing through the centre of the axis 2, will change with the rotation of the disc 1, but as the two lines are to be paralleled to each other the magnitudes of angles which both lines make with the horizontal line M N changes equally, in other words, the line connecting 5 and 6 and the line connecting 8 and 9 make the same angular displacement, and they never make any relative angular displacement between them and consequently the disc 1 and the link 7 which have 5 and 6, and 8 and 9 as fixed points on themselves respectively, make the same angular displacement and they never make any relative angular displacement between them. There will be no need of explaining that, similarly the links 3 and 4 make also the same angular motion and they never make any relative angular displacement between them. Thus in a link chain which is composed to a quadrilateral with opposite links having equal lengths respectively, jointing four links in succession at their both ends, the opposite links always make the same angular displacement.

The accompanying Fig. 1, is as explained above, one example of this quadrilateral link chain and shows two-dimensional relative motion of opposite links, in other words, relative motion of the line connecting 8 and 9 to the line connecting 5 and 6 in the same plane. In the case of the three-dimensional relative motion, i. e., when all the links 3, 4, 1 and 7 are not contained in the same plane, this link chain is also to be included in the above mentioned quadrilateral link chain as one of its modification, provided that the link 7 travels always parallel to a certain plane containing 5 and 6; and any appropriate method can be adopted for construction of jointing the links.

In Fig. 1, if we joint other links having a length equal to that of the links 3 and 4 to the disc 1 and link 7 at one end and the other end respectively parallel to the links 3 and 4, there will occur no difference in relative motion between the links, therefore this link chain is a modification of the above mentioned quadrilateral link chain.

Then we will now proceed to explain the sketch Fig. 2 showing one example of the device for transmission of motion of rotating bodies of the present invention.

10 is a large disc which is one of the two rotating bodies and 11 is a ring forming an intermediate link, and these 10 and 11 are so jointed by pins perpendicular to the plane of paper as to compose a quadrilateral link chain with opposite links having equal lengths respectively, together with links 12 and 13 of an equal length. 14 is a small disc which is the other of the rotating bodies and has an axis of rotation parallel or nearly parallel to that of 10, and 14 is also so jointed by pins perpendicular to the plane of paper as to compose a quadrilateral link chain with opposite links having equal lengths respectively, together with the common ring 11 and links 15 and 16, that is to say, the large disc 10 and the small disc 14 are connected by means of the two-stage quadrilateral link chain with opposite links having equal lengths respectively.

If the large disc 10 rotates taking its centre as axis, the ring 11 rotates with an angular velocity equal to that of the large disc 10, as a part of 11 constitutes the link opposite to 10, and the small disc 14 rotates with an angular velocity equal to that of the ring 11, as a part of 14 constitutes the link opposite to 11, that is to say, the small disc 14 rotates with an angular velocity equal to that of the large disc 10. Therefore if the small disc 14 is so made that it can only rotate taking its centre as axis, this small disc rotates with an angular velocity equal to that of the large disc taking its centre as axis, and it is evident that any difference does not occur between angular velocities of the two discs when the axis of the small disc coincides with that of the large disc at the point O, as shown in Fig. 2, or when these two axes do not coincide; but the range in which the distance between the axes of discs can be changed is to be determined by the lengths of links and positions of joints.

It is evident that any difference does not occur between the angular velocities of both discs even when either one of the discs rapidly moves relatively to the other disc, that is, the distance between axes of the two discs, varies maintaining their axes parallel to each other, and that the movement of either one of the discs does not influence the other disc, as this is a link chain consisting of five sets of links, the large disc 10, the pair of links 12 and 13, the intermediate link 11, the pair of links 15 and 16, and the small disc 14, connected in series, the discs 10 and 14 being the ends links, as already stated in the first point.

The above is an explanation of the case when the two axes of rotation are parallel to each other, but if a proper method is employed at the jointing points between the links, the device of the present invention can obtain nearly the same effect by applying the device of the present invention to practical use, even in case when the two axes of rotation are nearly parallel to each other.

Fig. 3 to Fig. 10 are examples of application of the present invention to an electric locomotive, showing only its main parts.

17 is a driving wheel fixed to one end of a driving axle 18, 19 is an axle box, 20 is a frame and is supported by a spring 21 of the axle box 19, and the frame 20 is allowed to move only up and down against the axle box, consequently against the driving axle and the driving wheel. 22 is an electric motor supported by the frame 20, 23 is the shaft of 22, 24 is a pinion fixed on one end of the motor shaft, and 25 is a bearing, and this bearing is fixed to the frame 20 in an appropriate manner. 26 is a gear wheel meshing with the pinion 24 and is to be freely rotated around a pin journal 27 taking it as axis, and the pin journal 27 is supported at a lower part of a bracket 28 fixed to the lower part of the bearing 25 and the frame 20, and the distance between 27 and the electric motor shaft 23 is to be kept constant. 29 is an intermediate link and is so jointed with a pair of connecting links 30 and 31 and the gear wheel 26, by pins 32, 33, 34 and 35, as to compose a quadrilateral link chain with opposite links having equal lengths respectively, and the above intermediate link 29 is also so jointed with another pair of connecting links 36 and 37 and the driving wheel 17, by pins 38, 39, 40 and 41, as to compose a quadrilateral link chain with opposite links having equal length respectively, and these four pins are made in spherical joint in order to transmit motion perfectly even when the driving axle 18 slightly moves axially and in order to avoid straining of the mechanism when the electric motor shaft 23 and the driving axle 18 are not parallel to each other.

42 and 43 are holes made on the gear wheel 26 to let through the pins 39 and 41. Rotation of the electric motor is transmitted from the pinion 24 to the gear wheel 26 by which the number of revolutions is reduced, and it is then transmitted to the driving wheel 17 by means of the link chain. The number of revolutions of the gear wheel 26 and the driving wheel 17 are always equal and their angular velocities are also equal, as can be understood by the explanation of Fig. 2 because the gear wheel 26 and the driving wheel 17 are connected by means of two-stage quadrilateral link chain with opposite links having equal lengths respectively. (But slight difference between angular velocities of the gear wheel and the driving wheel may occur when both rotating axes become non-parallel to each other, but this difference is so small that it is practically negligible.) Shock is never transmitted to the gear wheel through the link chain, even when the driving wheel vibrates up and down quickly by some cause.

Thus the present invention has a superior result, compared with old device for transmission of motion applied to electric locomotives as the angular velocities of both rotating bodies do not change absolutely as long as the axes of rotation remain parallel to each other, and as the mechanism of the device is simple.

I explained above the device of the present invention mainly with regard to electric locomotives, but, in short, the present invention relates to a device for transmission of motion of rotating bodies by which the revolving motion of a rotating body is to be transmitted to the other rotating body, connecting two rotating bodies, having their axes of rotation parallel or nearly parallel to each other, by means of the two-stage quadrilateral link chain with opposite links having equal lengths respectively, and modifications within the limits of not losing its essential points can be properly worked out in such a manner that they can be applied not only to the device for transmission of motion in electric locomotives, but to all kinds of devices for transmission of motion of rotating bodies.

I claim:

In an electric locomotive, the arrangement of a device for transmitting rotary motion of the type hereinbefore referred to in which one pair of parallel links are connected directly to the running wheel or driven member and to a floating ring forming the intermediate member, so as to constitute one jointed parallelogram, the other pair of parallel links being also directly connected to said floating ring, and to a gear wheel mounted in the locomotive frame, to constitute the second jointed paralellogram, the intermediate member and the two pairs of links connected thereto being positioned on the outside of the gear wheel, one pair of links being connected at their other ends direct to said gear wheel on the outside thereof, the other pair of links being connected to pins which pass through suitably arranged holes in the gear wheel and are fixed to the running wheel and the said gear wheel being in mesh with a pinion fixed on the electric motor shaft also mounted on the locomotive frame.

In testimony whereof I affix my signature.

KAZUO KOZAKI.